Sept. 23, 1969  T. W. MARTIN, SR., ET AL  3,468,529
CLOTH LAYING MACHINE HAVING CLOTH ROLL SUPPORTING
AND FEEDING STRUCTURE
Original Filed April 4, 1966  11 Sheets-Sheet 1

INVENTORS:
THOMAS W. MARTIN, SR.
ASA SCOBEY ROGERS, JR.
SHIRLEY B. ASHTON

Harrington A. Lockey
ATTORNEY

Sept. 23, 1969   T. W. MARTIN, SR., ET AL   3,468,529
CLOTH LAYING MACHINE HAVING CLOTH ROLL SUPPORTING
AND FEEDING STRUCTURE
Original Filed April 4, 1966   11 Sheets-Sheet

Fig. 5

INVENTORS:
THOMAS W. MARTIN, SR.
ASA SCOBEY ROGERS, JR.
SHIRLEY B. ASHTON
Harrington A. Lockey
ATTORNEY

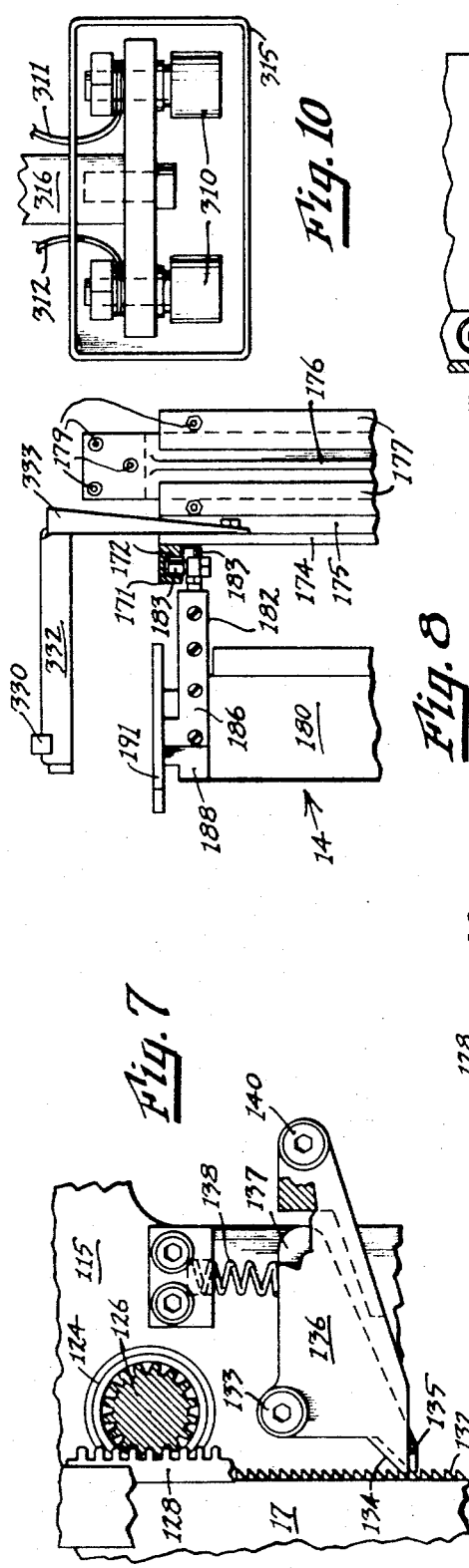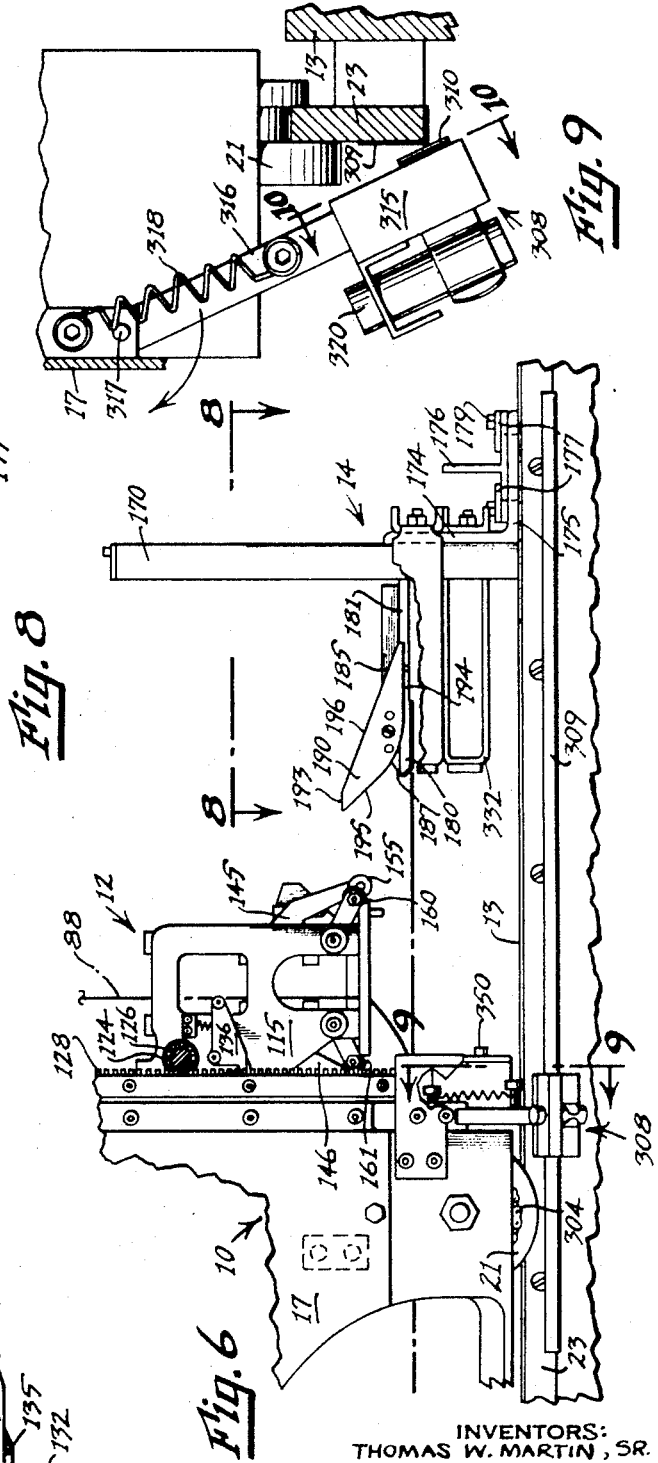

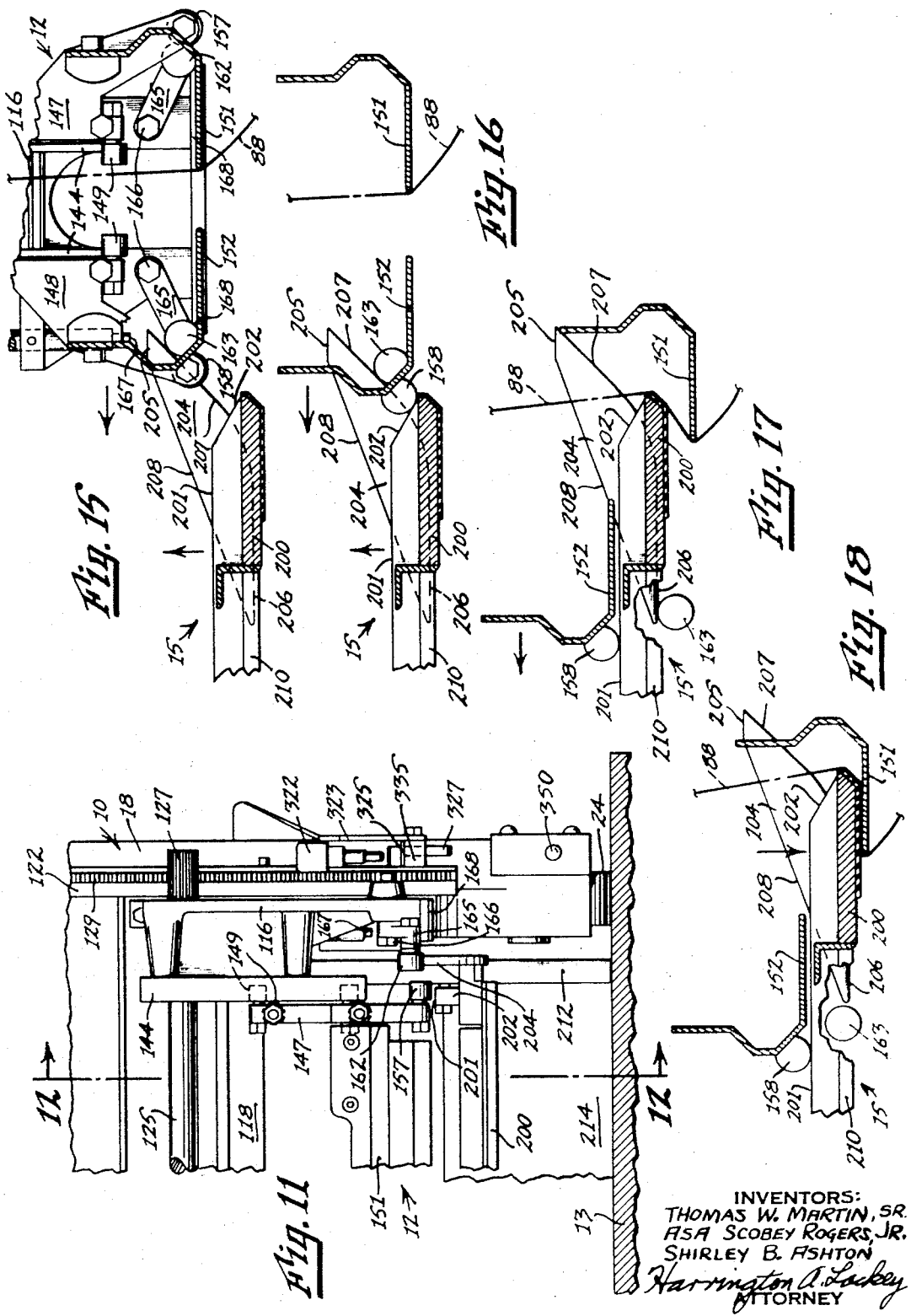

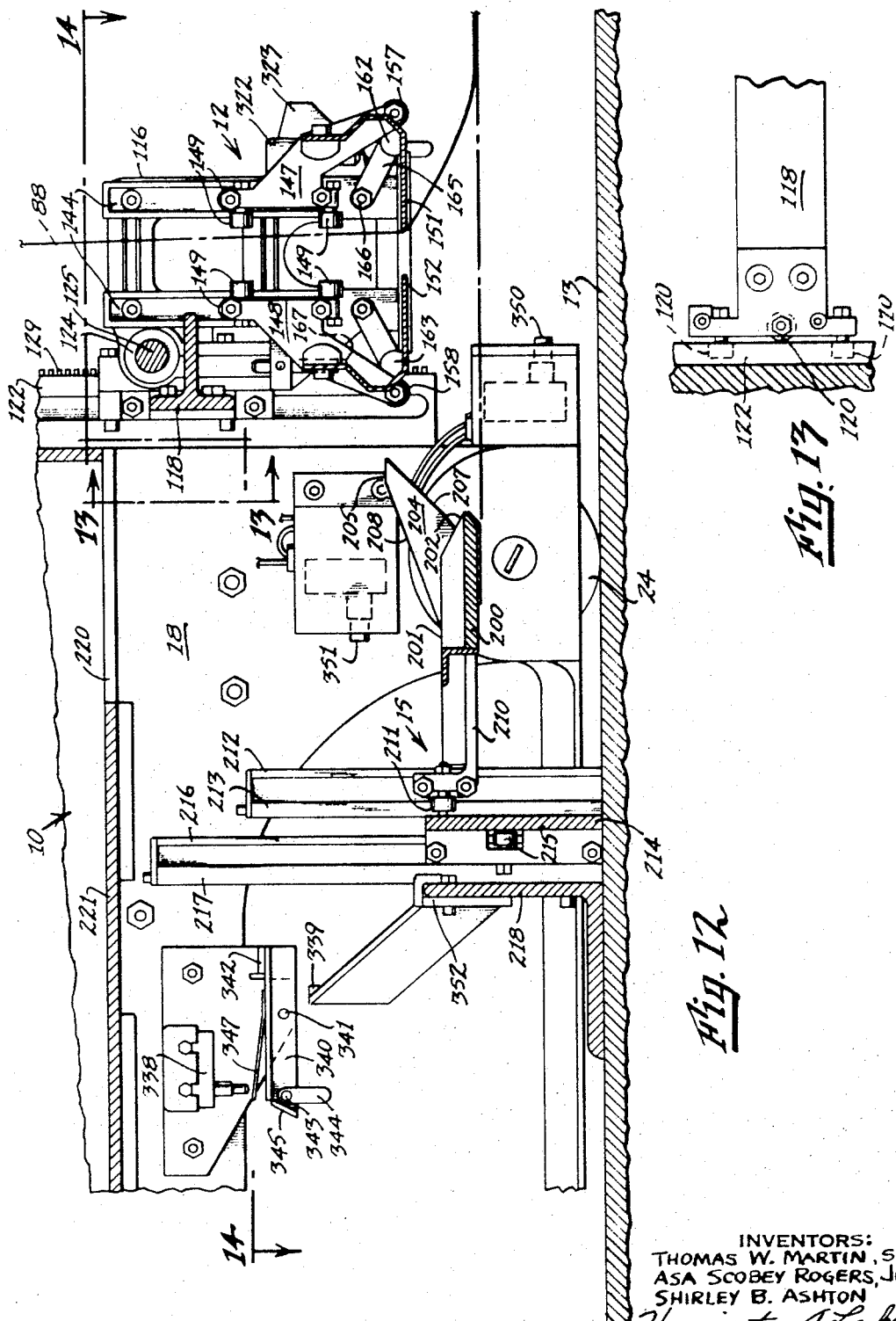

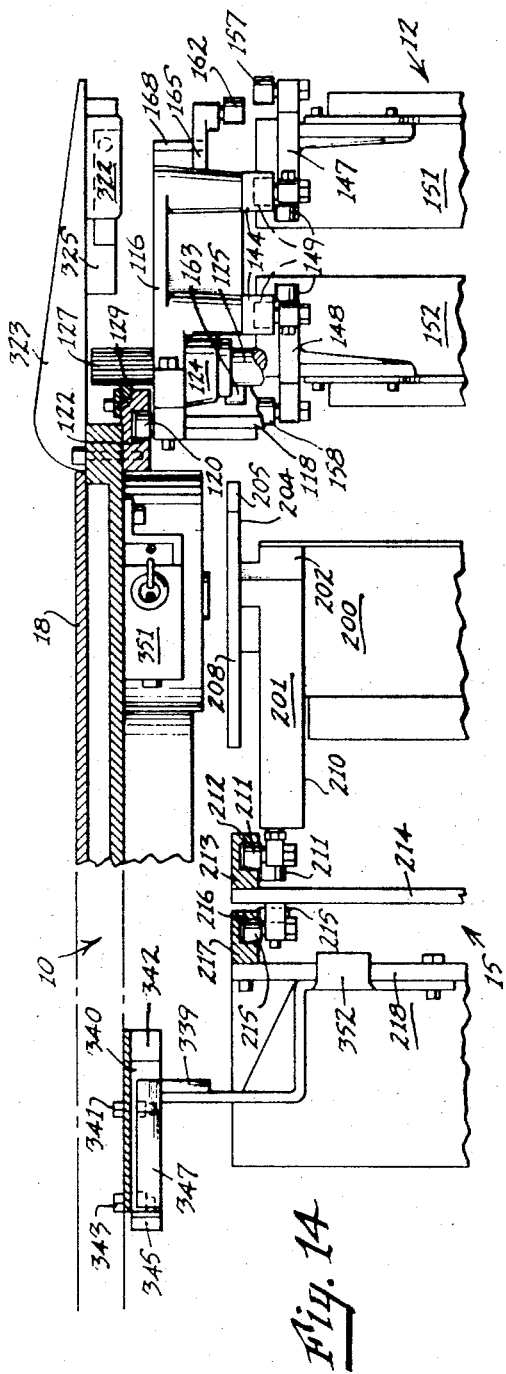
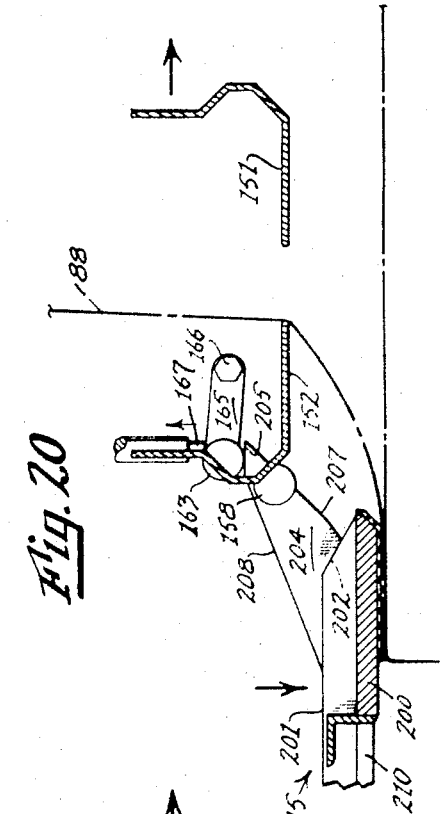
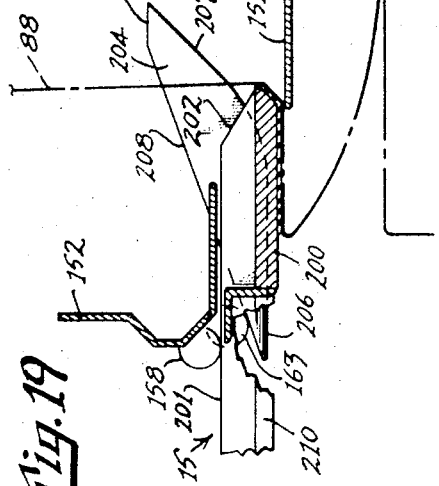

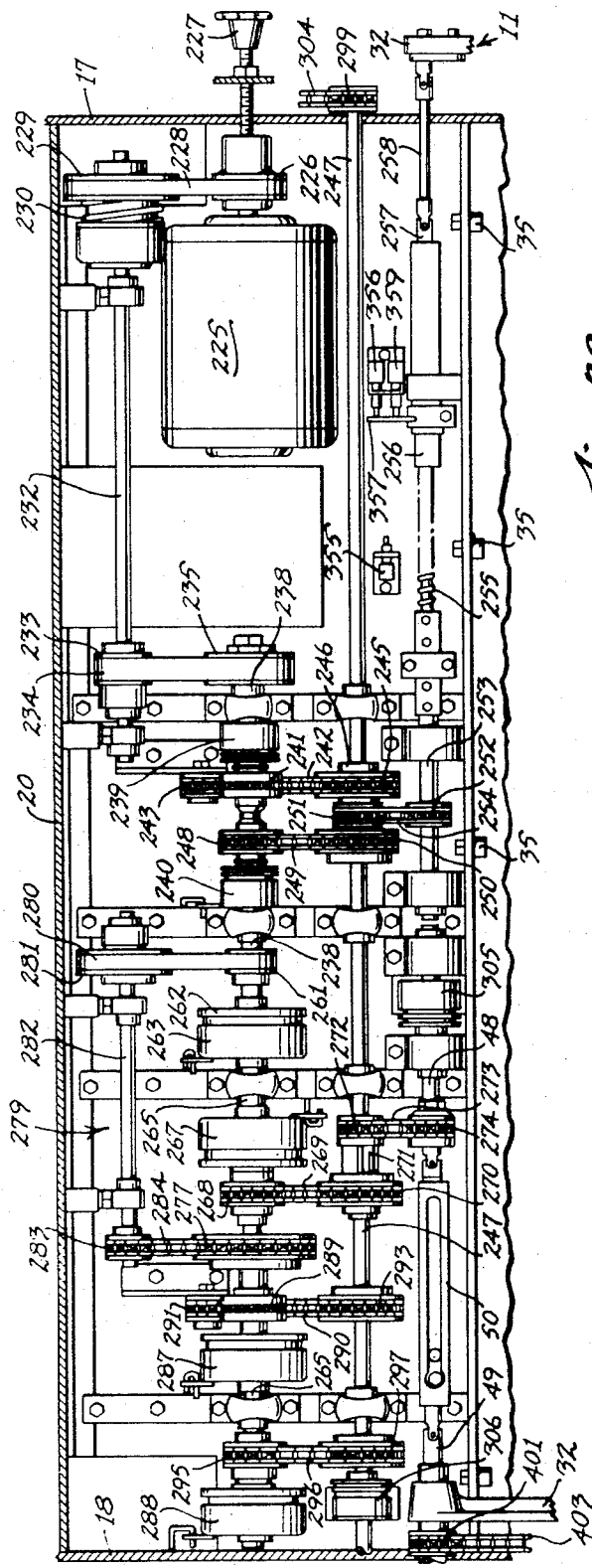
Fig. 22
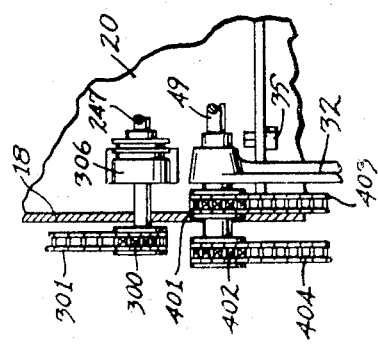
Fig. 22-A
INVENTORS:
THOMAS W. MARTIN, SR.
ASA SCOBEY ROGERS, JR.
SHIRLEY B. ASHTON
Harrington A. Lackey
ATTORNEY

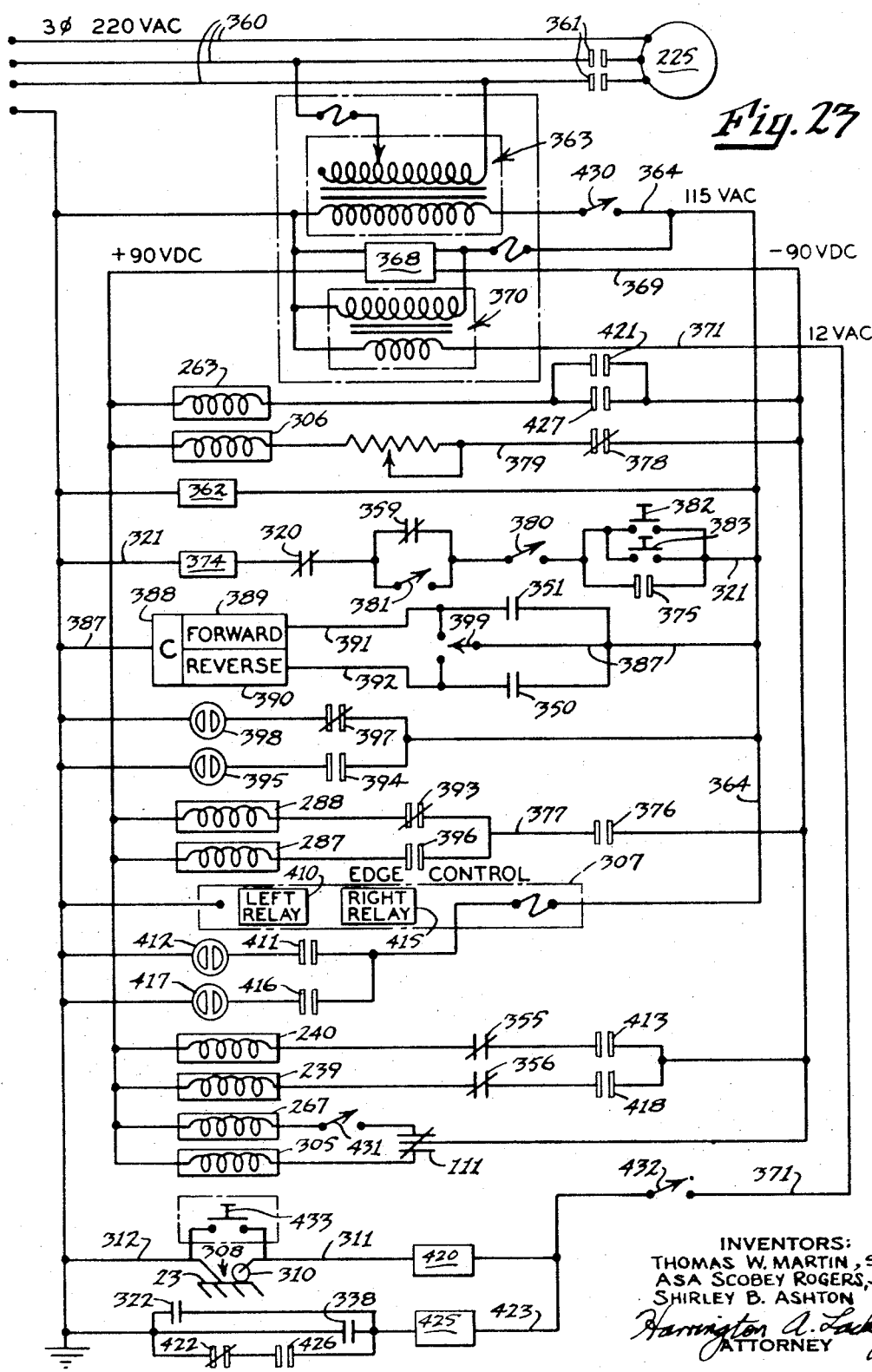

United States Patent Office 3,468,529
Patented Sept. 23, 1969

3,468,529
CLOTH LAYING MACHINE HAVING CLOTH ROLL
SUPPORTING AND FEEDING STRUCTURE
Thomas W. Martin, Sr., and Asa Scobey Rogers, Jr.,
Nashville, and Shirley B. Ashton, La Vergne, Tenn.,
assignors to Cutters Machine Company, Inc., Nashville,
Tenn., a corporation of Tennessee
Original application Apr. 4, 1966, Ser. No. 540,026, now
Patent No. 3,400,927, dated Sept. 10, 1968. Divided and
this application May 28, 1968, Ser. No. 739,950
Int. Cl. B65h 29/46, 17/12
U.S. Cl. 270—31         3 Claims

ABSTRACT OF THE DISCLOSURE

A cloth roll is cradled in two peripheral feed rollers. The core of the roll receives spindles which are guided on vertical uprights. One vertical upright carries remotely controlled means for elevating and lowering a spindle. The other vertical upright is mounted for swinging movement to an outboard inoperative position.

---

This is a division of application Ser. No. 540,026, filed Apr. 4, 1966, now Patent No. 3,400,927.

This invention relates to a cloth spreading machine, and more particularly to an improved, self-propelled automatic machine for spreading layers of cloth on a table.

One object of this invention is to provide a cloth spreading machine including frame carrying a cloth supply and a spreading unit toward and away from a catcher mechanism, in which the elevation of the spreading unit is a function of the height of the cloth layers.

Another object of this invention is to provide a cloth spreading machine including a cloth supply and spreading unit movable toward and away from a cloth catcher mechanism and having speed control means for normally moving the frame at high speed in the forward and reverse directions, but moving the frame at low speed as the frame approaches and leaves the catcher mechanism.

Another object of this invention is to provide a cloth spreading machine including a laterally movable cloth carrier, roller means on the cloth carrier for feeding the cloth to the spreading unit, and edge sensing means for controlling the lateral movement of the cloth carrier to maintain a straight cloth feed.

Another object of this invention is to provide a cloth spreading machine including a cloth carrier, a spreader unit and control means between the carrier and the spreader unit taking up the slack in the cloth.

A further object of this invention is to provide a cloth spreading machine having a cloth roll carrier adapted to facilitate loading a cloth roll upon the carrier.

Another object of this invention is to provide a cloth spreading machine including a longitudinally movable frame supporting a laterally movable cloth carrier, cloth roll feed means, frame drive and reversing means and speed change means for the frame, all driven by a single motor.

A further object of this invention is to provide a cloth spreading machine having a movable frame including a cloth supply and spreading unit for moving longitudinally toward and away from a catcher mechanism and change speed and reversing control means including, means for normally moving the frame in forward and reverse direction at high speeds, means for reducing the speed as the frame approaches the catcher mechanism at a predetermined distance from the catcher mechanism, means for reversing the direction of the frame after the cloth is folded and engaged by the catcher mechanism, and means for changing the speed of the frame from low speed back to normal high speed as the frame leaves the catcher mechanism, but in less than the predetermined distance in which the speed is changed to low speed when the frame approaches the catcher mechanism.

Further objects and advantages of the invention will be apparent from the following description taken in conjunction with the drawing wherein:

FIG. 5 is a section taken along the line 5—5 of FIG. 4;

FIG. 6 is a fragmentary side elevation of the front portion of the frame supporting the spreader unit above the table, adjacent the front catcher mechanism;

FIG. 7 is an enlarged fragmentary side elevation of the elevating and latching mechanism for the spreader unit;

FIG. 8 is a section taken along the line 8—8 of FIG. 6 showing the left end portion of the front catcher mechanism;

FIG. 9 is an enlarged section taken substantially along the line 9—9 of FIG. 6;

FIG. 10 is a section taken along the line 10—10 of FIG. 9;

FIG. 11 is a fragmentary front elevational view of the left portion of the frame and spreader unit, with the table shown in section;

FIG. 12 is a fragmentary section taken along the line 12—12 of FIG. 11;

FIG. 13 is a section taken along the line 13—13 of FIG. 12;

FIG. 14 is a section taken along the line 14—14 of FIG. 12;

FIGS. 15–20 are fragmentary elevational sectional views showing the operative sequences of the spreader unit approaching and leaving the rear catcher mechanism;

FIG. 22 is a top plan view of the drive train assembly with the housing removed;

FIG. 22A is a fragmentary top plan view of the left end extension of FIG. 22; and FIG. 23 is a schematic diagram of the electrical circuits for the cloth spreading machine.

Figures 1, 21:
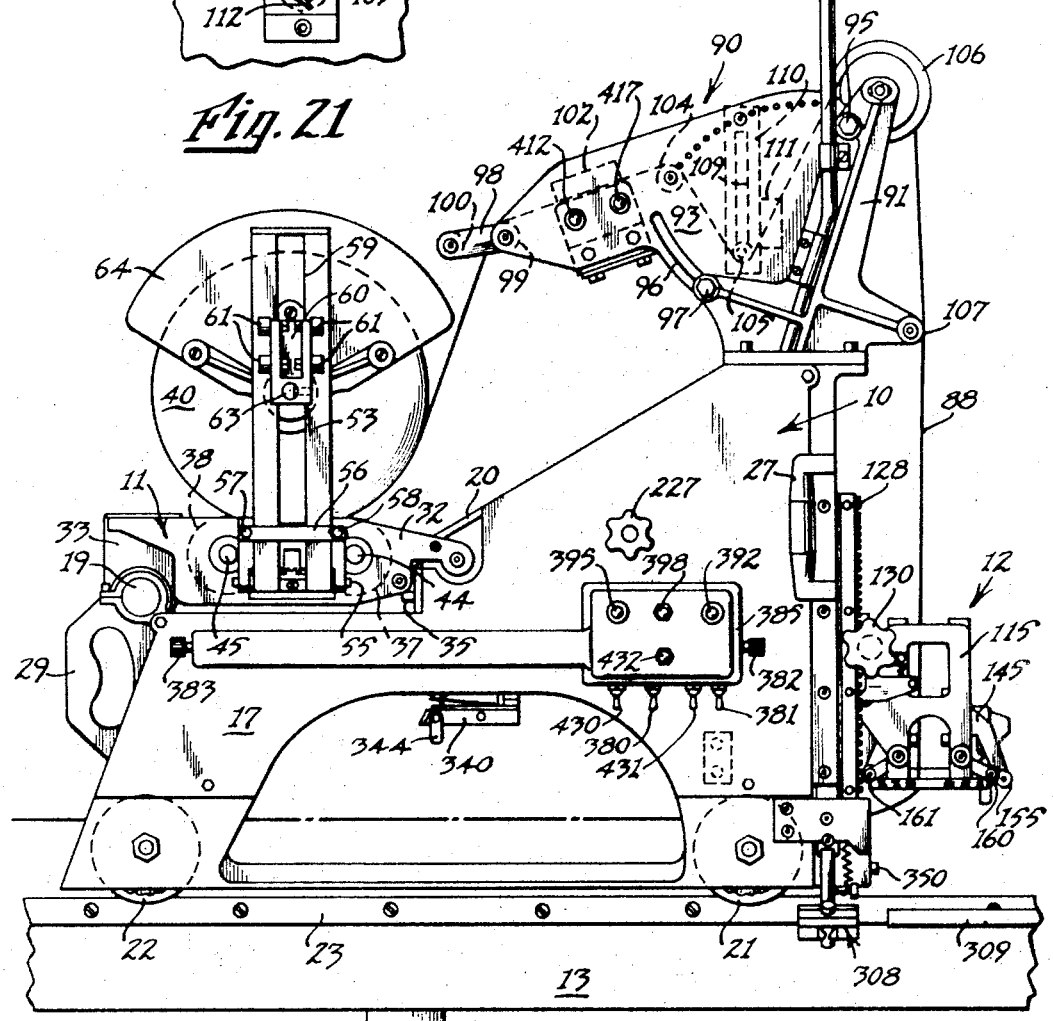
FIG. 1 is a side elevation of the cloth spreading frame mounted on the table, shown fragmentarily.
FIG. 21 is an enlarged fragmentary section taken along the line 21—21 of FIG. 4, showing the cloth take-up mechanism.

Referring now to the drawings in more detail, the cloth spreading machine made in accordance with this invention includes a frame 10 supporting a cloth carriage 11 and a spreader unit 12 for longitudinal reciprocable movement upon a table 13 between catcher mechanisms 14 and 15.

The frame 10 includes a right side or end frame member 17 and a left side or end frame member 18. The side frame members 17 and 18 are rigidly spaced apart by various transverse members, such as the rear slide beam 19, the drive train assembly housing 20, and various other members which will be described later.

Front and rear circumferentially grooved wheels 21 and 22 are rotatably mounted on the bottom of the right side frame member 17 to ride on a track or rail 23 fixed along the length of the right side of the table 13. Supporting the opposite left side frame member 17 for rolling movement upon the top surface of the table 13 are front wheel 24 and rear wheel 25.

In order to manually move the frame 10 along the table 13, side handles 27 and 28 and rear handles 29 and 30 are fixed to the frame 10.

The cloth carriage 11 includes a carriage frame 32 mounted for reciprocable movement upon and laterally of the machine frame 10. A pair of collars or sleeves 33 depend from the rear of the carriage frame 32 to slidably receive the cylindrical beam 19. Fixed to the front of the carriage frame 32 is an elongated transverse rod 34 supported for rolling movement on a plurality of rollers or casters 35 rotatably supported about longitudinal horizontal axes on the rear wall of the drive train housing 20.

Rotatably mounted on the carriage frame 32 are a pair of cloth feed rollers 37 and 38. The rollers 37 and 38 are mounted parallel to each other longitudinally of the carriage frame 32 but transversely of the machine frame 10, and spaced apart slightly to support a cloth roll 40. As disclosed in FIG. 4, the cloth feed rolls 37 and 38 are shown divided longitudinally into separate roller sections mounted on intermediate bearings 41 to provide greater strength for supporting the cloth rolls 40, which can be quite heavy. Moreover, the spacing between feed rollers 37 and 38 is less than the diameter of the core of the cloth roll 40 in order to continue supporting the cloth roll even after the cloth has been completely unwound from the core. On the other hand, the spacing between the cloth feed rollers 37 and 38 is sufficient to provide stability and support for the cloth roll 40 as it is being rotated by the feed rollers, and as the cloth is fed from beneath the roll by the feed rollers 37 and 38. The left ends of the cloth feed roller shafts 44 and 45 (FIG. 4) are driven in the same direction, that is, clockwise as viewed in FIG. 5, and at the same speed through any suitable transmission, such as that disclosed in FIGS. 4 and 22A, to be described later. Cloth feed roll drive shaft 48 drives the transmission in housing 46 through a drive shaft extension connected to shaft 48 through the splined telescoping coupling mechanism 50, to permit lateral reciprocation of the shaft extension 49 with the feed rollers 37 and 38 and cloth carrier 11, while transmitting the rotational movement of the feed roll drive shaft 48 to the rollers 37 and 38.

Mounted on opposite ends of the carriage frame 32 are upright standards 53 and 54. The left upright standard 54 is mounted rigidly on the left end of the carriage frame 32, while the right standard 53 is pivotally mounted on the right end of the frame 32 about hinge 55. The pivotal standard 53 is maintained in its upright position by a pivoted latch bar 56 hinged about pin 57, the opposite end of which is hooked and secured by the bolt 58. The pivotal standard 53 is provided with an elongated vertical slot or guideway 59 for receiving, for free vertical longitudinal movement, a spindle support 60. The spindle support 60 includes a plurality of roller bearings 61 for guiding the support 60 within the guideway 59. A spindle 63 is fixed to the spindle support 60 and adapted to extend inboard of the support 60 and horizontal when the standard 53 is in its normally vertical upright position. Spaced inboard of the spindle support 60 and fixed on the spindle 63 is a large cloth roll guide plate 64 and a conical cloth roll bearing 65. The inner end of the spindle 63 extends inwardly slightly beyond the conical bearing 65. Thus, the inner end of the spindle 63 and the conical bearing 65 are adapted to be inserted into the right end of the core of a cloth roll 40 for rotation about the bearing 65. Side plate 64, which is fixed normal to the spindle 63, is adapted to prevent exceptional disalignment of the edges of the cloth on the roll 40.

The left standard 54 is substantially identical to the right standard 53, having vertical slot or guideway 69 for receiving the left spindle support 70. The left spindle support 70 is identical to the right spindle support 60, and includes roller bearings 71 for guiding the spindle support 70 for free, vertical, reciprocable movement in the guideway 69. The left spindle 73 is fixed in the spindle support 70 to extend inboard, and is also provided with a guide plate 74 and a conical bearing 75 identical to the guide plate 64 and conical bearing 65.

Since the spindle supports 60 and 70 are adapted to freely reciprocate vertically within the slots 59 and 69 in the corresponding upright standards 53 and 54, it is apparent that the conical bearings 65 and 75 and spindles 63 and 73 are free to maintain coaxial alignment with the core of the cloth roll 40 as the diameter of the roll 40 is gradually reduced by the feeding of the cloth.

If desired, the conical bearings 65 and 75 and guide plates 64 and 74 may be laterally adjusted upon the corresponding spindles 63 and 73 to accommodate various widths of the cloth rolls 40 by appropriate adjustment means, not shown.

In order to permit a single operator of the machine to accurately align the left spindle 73 with the left end of a cloth roll 40, from the right side of the machine, the left spindle support 70 is provided with a remote control mechanism. Fixed to the top of the spindle support 70 is a cable 77 extending upwardly and over a pulley 78 fixed to the top of the left standard 54 (FIG. 5). The cable 77 is then threaded around a second pulley 79 fixed to the bottom of the standard 54 and guided rearwardly about a third pulley 80 (FIG. 3), and then toward the right across the rear end of the carrier frame 33 where the cable 77 passes around a drum 81 rotatably mounted on the carrier frame 32. The drum 81 is controlled by a hand wheel 82 and located adjacent the right side of the frame 10 for convenient operation by an operator standing on the right side of the machine and the table 13. The cable 77 extends from the drum 81 toward the left side of the carrier frame 32 about guide pulleys 83 and rear pulley 84 (FIG. 3), and then forwardly and upwardly about lower pulley 85 to terminate in a fixed connection to the bottom of the spindle support 70. It will thus be seen that by merely rotating the hand wheel 82 in one direction or the other, the operator may adjust the vertical position of the left spindle 73 and conical bearing 75 to the appropriate height for insertion into the left end of a cloth roll 40 introduced upon the cloth carrier 11.

The cloth 88 fed from the cloth roll 40 to the spreader unit 12 is fed through an intermediate cloth guide assembly 90. The guide assembly 90 includes a pair of standards 91 and 92 to which are adjustably attached side plates 93 and 94. Each side plate 93 and 94 is pivotally supported to its corresponding standard 91 and 92 by a bolt 95. Elongated arcuate slots 96 may be provided in the bottom parts of the plates 93 and 94, respectively, to receive bolts 97 extending through the standards 91 and 92, respectively. The radii of the arcuate slots 96 are of course equal to the distance between the bolts 97 and 95. In this manner, the plates 93 and 94 may be pivotally and adjustably mounted with respect to their corresponding standards 91 and 92.

Adjustably mounted on the rear ends of the plates 93 and 94 are side brackets 98 supporting cloth guide rollers 99 and 100. Although as shown, the cloth 88 is initially fed from the cloth roll 40 over the guide roller 99, it will be understood that it may be threaded over the roller 100 if desired, for example, for different pivotal adjustments of the plates 93 and 94. The cloth 88 is then fed forwardly from one of the guide rollers, 99 or 100, across a platform 101, the right end of which supports an edge sensing head 102 of any conventional type, such as a photoelectric sensing head, which will maintain the edge of the cloth 88 in a straight longitudinal path. One example of such a photoelectric edge sensing device for cloth edge control is shown in the expired King Patent 2,078,669.

From the edge sensing platform 101, the cloth 88 is fed across another guide roller 104 and then downwardly beneath a cloth take-up bar 105 or roller, for taking up the slack in the cloth 88, and then upwardly about idler feed roll 106 rotatably supported on the upper ends of the standards 91 and 92. The cloth 88 then descends about a guide bar or roller 107, and then passes into the spreader unit 12.

As best disclosed in FIGS. 5 and 21, the ends of the take-up bar 105 are mounted for free vertical reciprocation within the slots 109 of elongated brackets 110 fixed on the insides of the opposite side plates 93 and 94. Disposed adjacent the front edge of the right bracket 110 is a microswitch 111 having a switch finder 112 extending rearwardly and across the bottom portion of the slot 109 in the path of the take-up bar 105. As will be described later, the microswitch 111 is connected to means for driving the cloth feed rollers 37 and 38. Thus, as long as there is sufficient tension in the portion of the cloth 88 between the guide roller 104 and the idler roller 106 to maintain the take-up bar 105 in slots 109 above the switch finger 112, the microswitch 111 will remain normally closed to energize the cloth feed roller drive means. However, when sufficient slack develops in the cloth 88 to permit the cloth take-up bar 105 to drop by gravity to engage the finger 112 and open the switch 111, the cloth feed roller drive means will be stopped until the spreader unit 12 eliminates the excess slack so that the take-up bar 105 may rise and actuate the switch 111 to resume feeding the cloth.

The spreader unit 12 includes a pair of end or side frames 115 and 116 spaced apart on opposite sides of the machine in vertical parallel relation by a T-bar 118. The spreader unit 12 is mounted for vertical reciprocable movement upon the front of the machine frame 10 by means of a plurality of rollers, not shown, mounted on the end frame 115 and rollers 120 mounted on the end frame 116 for movement in vertical tracks, such as 122, supported on the front of the machine frame 10 (FIGS. 13 and 14).

Rotatably supported in bearings 124 in the end frames 115 and 116 is the transverse pinion shaft 125. The ends of the shaft 125 outside the end frames 115 and 116 comprise pinions 126 and 127 for engagement with racks 128 and 129, respectively. Upon the end of the right pinion 126 is a hand wheel 130 for manually rotating the pinion 126, shaft 125 and pinion 127 in order to move the spreading unit 12 up and down relative to the machine frame 10.

Figure 2:
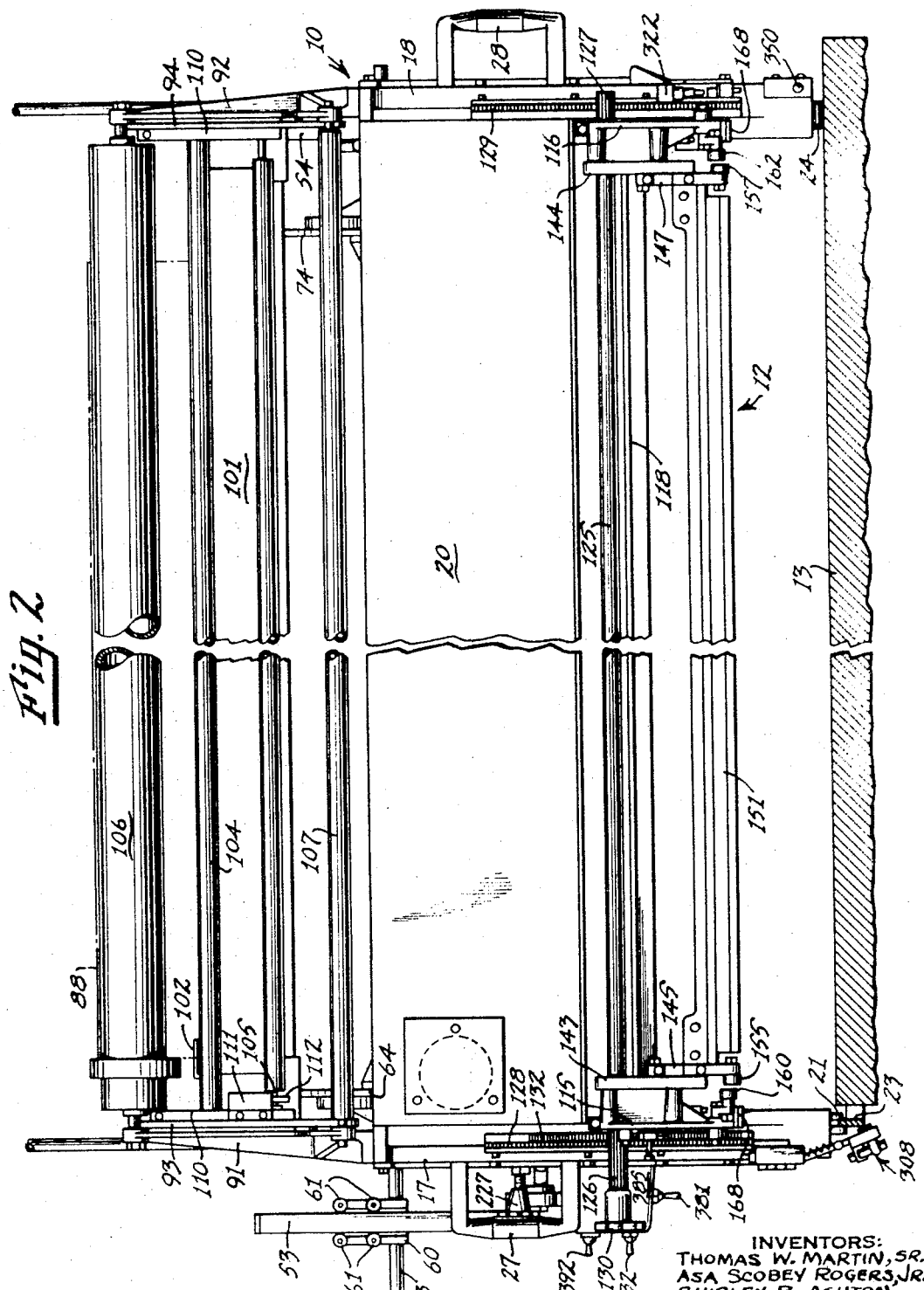
FIG. 2 is a front elevation of the spreading frame shown in FIG. 1 with the table shown in section.

In order to lock the spreader unit 12 in various elevated positions, a straight vertical ratchet bar 132 is mounted on the front of the machine frame 10 adjacent and inside the rack 128, as best disclosed in FIGS. 2 and 7. Pivotally mounted on the right spreader end frame 115 by the pivot pin 133 are a pair of pawls 134 and 135. The teeth of the ratchet bar 132 are inclined upwardly, so that the pawls 134 and 135 will prevent the spreader unit 12 from descending, and will permit upward movement only. The pawls 134 and 135 are provided with forwardly extending arms 136 and 137 on the opposite side of the pivot pin 133, which are normally heavy enough to bias the pawls 134 and 135 toward the ratchet bar 132. However, a spring 138 may be added, if desired, to assure proper engagement of the pawls 134 and 135 with the ratchet bar 132. The forward end of the arm 136 is also provided with a small handle 140 to be urged upwardly by the operator for releasing both pawls 134 and 135 from the ratchet bar 132. The purpose of the double vertically staggered pawls 134 and 135 is to increase the number of increments within a given height, and thereby increase the sensitivity of the elevation of the spreader unit 12.

Figure 3:
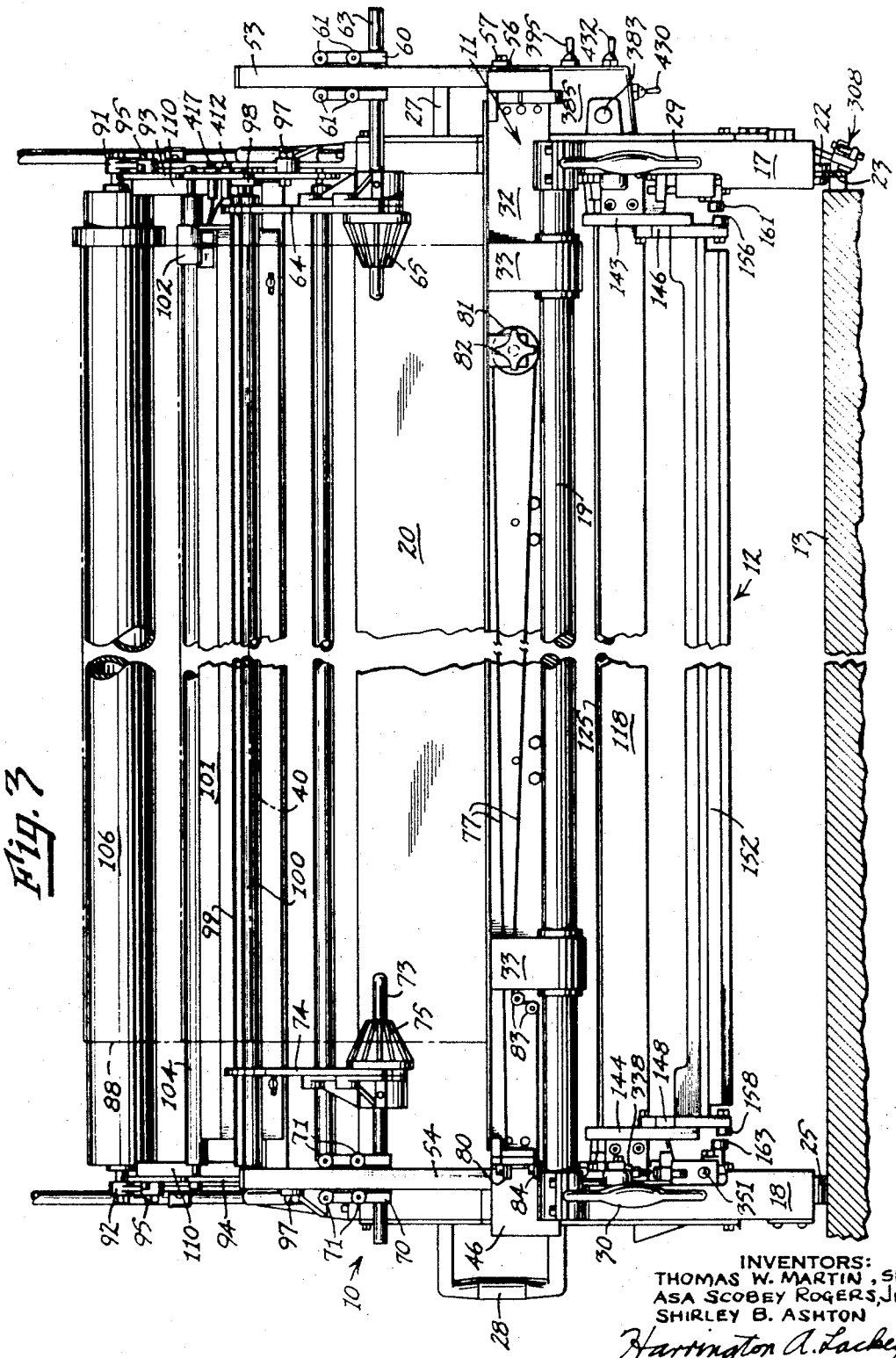
FIG. 3 is a rear elevation of the spreading frame shown in FIG. 1 with the table shown in section.
Figure 4:
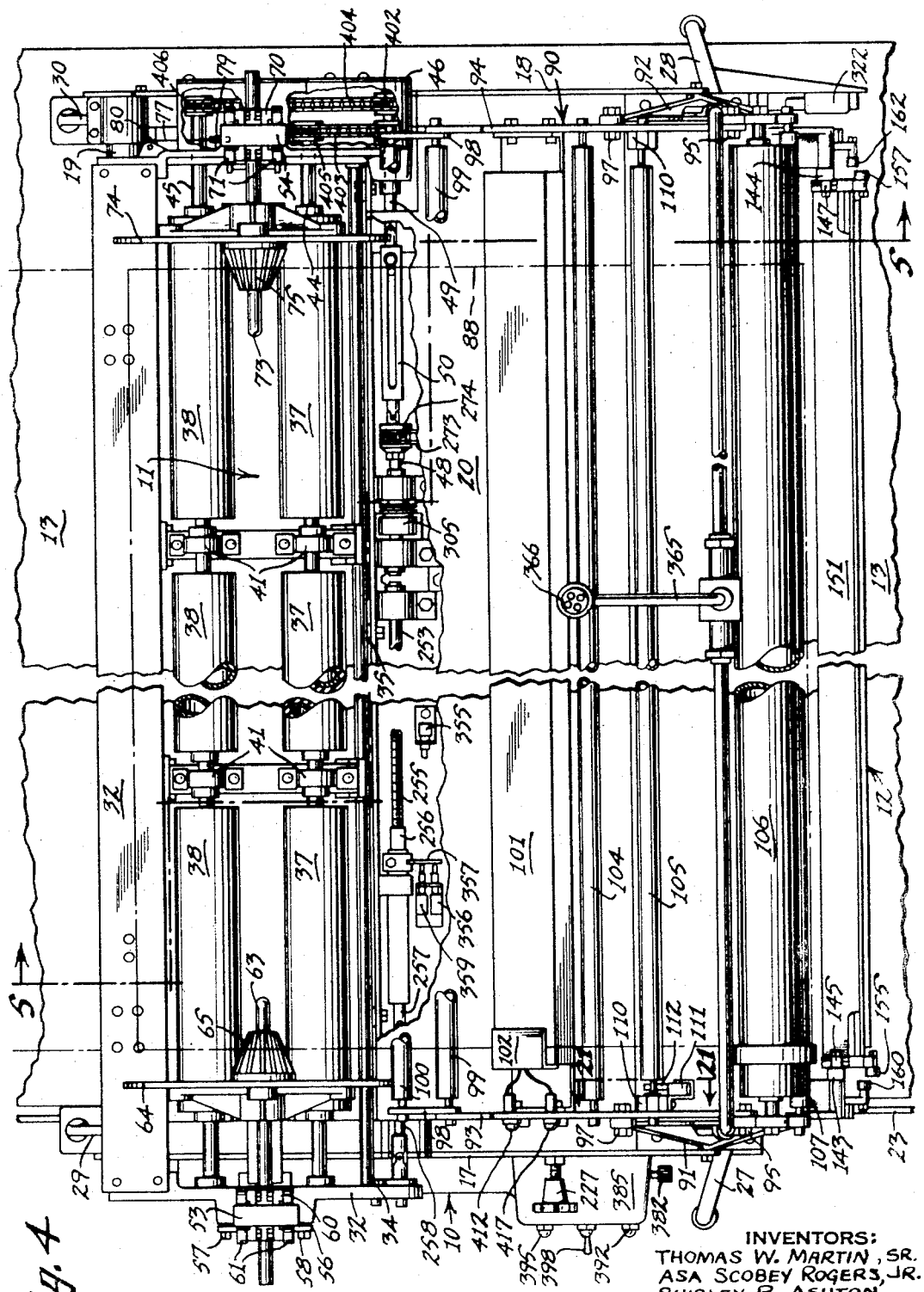
FIG. 4 is a top plan view of the spreading frame shown in FIG. 1, with parts broken away, and with the table shown fragmentarily.

Upon the inside of each spreader end frame 115 and 116 are a pair of vertical tracks 143 and 144 respectively, receiving for vertical reciprocable movement the fold blade brackets 145, 146, 147, and 148 (FIGS. 3, 4, and 12). Each bracket 145–148 is provided with roller bearings 149 for guiding the bracket vertically in the tracks 143 and 144. The front blade brackets 145–147 support at opposite ends the front fold blade 151, while the rear blade brackets 146 and 148 support at opposite ends the rear fold blade 152. Thus, the fold blades 151 and 152 are disposed horizontally and transversely of the machine frame 10 with the blades directed toward each other and spaced slightly apart in order that the cloth 88 may be fed between the blades 151 and 152. Moreover, the blades 151 and 152 alternate in engaging the cloth 88 for spreading the cloth upon the table 13, depending upon the direction of longitudinal movement of the machine frame 10. Furthermore, the blades 151 and 152 are normally level when the brackets 145–148 are resting at the lower limits of the tracks 143 and 144.

Mounted on the lower portion of each blade bracket 145–148, and in a position to lead the corresponding fold blades 151 and 152, depending upon the longitudinal direction in which the machine frame 10 is travelling, are cam followers 155, 156, 157 and 158, respectively, preferably in the form of rollers.

Pivotally mounted on the inside of the spreader end frame 115 are a front cam follower 160 and a rear cam follower 161, and similarly mounted on the inside of the spreader end frame 116 are a front cam follower 162 and a rear cam follower 163 (FIGS. 1, 2, 3 and 12). Each of the cam followers 160–163 is preferably a cam roller and is mounted outboard of the corresponding cam followers 155–158 as well as outboard of the tracks 143 and 144.

As best disclosed in FIGS. 11 and 12 the cam follower roller 162 is journaled on one end of a follower arm 165, the opposite end of which is pivotally connected to the left end frame 116 by a pin 166. Thus, cam follower 162 may pivot in a vertical plane freely about the pin 166. However, the cam follower 162 is limited in its upward movement by the adjustable stop screw 167 and in its lower movement by the ledge 168 (FIG. 11). All of the other pivotal cam followers 160, 161 and 163 are constructed identically to the cam follower 162, and provided with the same upper limit devices 167 (FIG. 20) and lower limit devices 168 (FIG. 15).

Referring now to FIGS. 6 and 8, the front movable catcher mechanism 14 may be located in any stationary position on table 13 to determine the forward limit of the longitudinal traverse of the frame 10, and is adapted to form a fold within the cloth by operative engagement with the spreader unit 12. As disclosed in the drawings, the movable catcher mechanism 14 is located in front of the frame 10. The catcher mechanism 14 comprises a pair of upright standards 170 and 171 provided with opposed vertical tracks 172. The standards 170 and 171 are fixed in transverse spaced relation by the transverse angle plate 174. The horizontally extending flange 175 of the angle plate 174 is held on the table in stationary position by means of the transverse T-bar 176, lap plates 177 and bolts 179. By removing bolts 179, the catcher mechanism 14 may be adjusted longitudinally of the table 13 in order to vary the longitudinal traverse of the spreading machine frame 10.

The catcher bar or plate 180 transversely spans the table 13 and is provided at opposite ends with the brackets 181 and 182 having roller bearings 183 for riding in the vertical tracks 172 of the standards 170 and 171. Mounted on top of each end bracket 181 and 182 are longitudinal horizontal cam surfaces 185 and 186, respectively, having rearwardly and downwardly sloping toe portion 187 and 188. The cam surfaces 185 and 186 are longitudinally aligned with and adapted to engage the cam follower 155 and 157, respectively, for raising the fold blade 151 above the catcher bar 180.

Mounted on the catcher bracket 181 and 182 outboard of the cam surfaces 185 and 186, are cams 190 and 191, respectively. The cam 190 is in longitudinal alignment and adapted to engage cam follower 160, while the cam 191 is in longitudinal alignment and adapted to engage the cam follower 152. Cam 190 has the configuration shown in FIG. 6, with a substantially short, horizontal top edge or land 193, a substantially longer bottom surface 194, a forward or leading edge 195 sloping downwardly toward the standard 170 and connecting the top land 193 and the bottom surface 194. The reverse or back edge 196 of the cam 190 also slopes from the top land 193 downwardly and toward the catcher standard 170 to connect the bottom surface 194. Cam 191 has the identical shape as cam 190.

At the opposite end of the table 13 from the moveable catcher mechanism 14 the catcher mechanism 15 is permanently mounted. Although the drawings, particularly FIGS. 11, 12 and 14, only show the left portion of the catcher mechanism 15, it will be understood that the right portions are provided with similar elements and the catcher mechanism 15 is symmetrical about the longitudinal center line of the table 13.

Catcher mechanism 15 includes a catcher bar or plate 200, indentical to the catcher bar 180, having a left horizontal cam surface 201 and cam toe portion 202 adapted to engage the fold plate bracket cam 158. Spaced adjacent and outboard of cam surface 201 is the cam 204 having a shape identical to the cams 190 and 191 of FIGS. 6 and 8. Cam 204 has a top horizontal land 205, bottom surface 206, a forward or lead sloping edge 207 and a reverse or back sloping edge 208. A similar cam surface and cam are also mounted on the right end of catcher bar 200, which are not shown in the drawings. The cam 204 is disposed vertically and in longitudinal alignment with and adapted to engage the pivotal cam follower 163. In a similar manner, the right cam surface and the right cam are adapted to engage the cam followers 156 and 161, respectively.

The catcher bar 200 is supported at its left end by bracket 210 having roller bearings 211 adapted to freely roll vertically within the track 212 of standard 213. The right end of the catcher bar 200 is supported in a similar manner. In turn, the standard 213 is fixed to bracket 214, which is provided with roller bearings 215 adapted to be guided vertically within the vertical track 216 of the standard 217. It will thus be seen that the catcher bar 200 is adapted to freely reciprocate vertically within the upper and lower limits of the first standard 213, and the standard 213 is adapted to reciprocate vertically with respect to the fixed standard 217. In FIG. 12, it will be noted that the frame 10 has been moved almost to the rear extremity of its cloth spreading traverse, and in this position, straddles the catcher mechanism 15. The purpose of the double standards 213 and 217 is merely to give the catcher bar 200 a little extra height in order to spread cloth to a slightly higher level than could be accomplished if there were only one fixed standard. For example, when the catcher bar 200 has been moved to the upper limit of the track 212, then further spreading of the cloth will cause the catcher bar 200 to continue to move upwardly and thereby carry the standard 213 upwardly until the cam 204 extends upwardly through the opening 220 in the floor 221 of the frame 10. Of course, when the frame 10 begins to move in the opposite direction, the catcher plate 200 will be permitted to descend through the hole 220 so that the floor 221 will clear, not only the cam 204, but also the tops of the standards 213 and 217.

Referring now to FIGS. 22 and 22A, the drive train for the spreading machine is contained within the housing 20 and includes the single motor 225. The motor 225 drives a variable pulley 226, the diameter of which may be varied by the handle 227 extending outboard of the right end frame member 17. The endless belt 228 carried by the variable pulley 226 also extends around a driven variable pulley 229, the diameter of which automatically varies inversely with the change in diameter of the variable pulley 226. The flanges of driven variable pulley 229 are biased toward each other to always maintain the endless belt 228 in tension by means of the spring 230. The driven variable pulley 229 is fixed to and drives shaft 232 which carries another pulley 233 provided with overrunning clutch means to rotate in only one direction. Pulley 233 carries an endless belt 234 which in turn drives pulley 235 mounted to drive the primary shaft 238. Primary shaft 238 carries right and left edge-control magnetic clutches 239 and 240, both of which are normally de-energized so long as the cloth is feeding longitudinally in a straight line within the desired tolerances. The right edge-control magnetic clutch 239 is adapted to actuate the right armature sprocket 241 engaging endless chain 242 carried about the idler sprocket 243 and right secondary sprocket 245 to drive secondary sprocket 245 in the reverse direction from right armature sprocket 241. The right secondary sprocket 245 is fixed to sleeve 246, which receives and is freely rotatable about the wheel drive shaft 247.

The left edge-control magnetic clutch 240 is adapted to actuate the left armature sprocket 248 carrying chain 249 for rotating secondary sprocket 250 in the same direction as the rotation of the primary shaft 238. It will be noted that secondary sprocket 250 is fixed to the same sleeve 246 to which secondary sprocket 245 is fixed. The sleeve 246 also carries another intermediate sprocket 251, which in turn drives sprocket 252 and shaft 253 through chain 254. The screw drive shaft 253 is fixed to the screw 255 which is threaded into collar 256, which in turn is connected through shaft 257 and universal shaft 258 to the right end of the carriage frame 32. Thus, it will be seen that the carriage frame 32 may be moved laterally in either direction depending upon the rotation of the screw 255, which in turn depends upon which of the magnetic clutches 239 or 240 is energized.

The left end of the primary shaft 238 supports a small pulley 261 and the armature 262 of the high-speed magnetic clutch 263. The high-speed clutch 263 is fixed to and adapted to rotate with the secondary shaft 265, which is in axial alignment with the primary shaft 238.

Also mounted to be driven with the secondary shaft 265 is the cloth feed magnetic clutch 267 adapted to actuate armature sprocket 268 carrying endless chain 269 for driving secondary sprocket 270 fixed on the sleeve 271. Sleeve 271 is adapted to rotate independently about the wheel drive shaft 247, and also supports a secondary drive sprocket 272 carrying chain 273 for driving sprocket 274. The driven sprocket 274 in turn drives the shaft 48, splined coupling 50 and laterally reciprocable shaft 49, which positively drives the two cloth feed rollers 37 and 38 through the transmission in housing 46. As disclosed in FIGS. 4 and 22A, sprockets 401 and 402 carry chains 403 and 404, respectively, which drive sprockets 405 and 406 on shafts 45 and 46 to rotate cloth feed rolls 37 and 38 in the same direction as shafts 48 and 49.

Mounted to the left of the cloth feed clutch 267 and fixed on the secondary drive shaft 265 is a large sprocket 277. When the high-speed magnetic clutch 263 is energized, the primary shaft 238 and the secondary shaft 265 will be coupled to operate as a single shaft at high speed. When the high-speed magnetic clutch 263 is de-energized, the primary shaft 238 continues to rotate at the same high speed, but is coupled to the secondary shaft 265 through a reduction drive train 279, including the small pulley 261, belt 280, large pulley 281, shaft 282, small sprocket 283, and chain 284, which in turn drives the large sprocket 277. Consequently, the secondary shaft 265 will be driven at a slower speed than the primary shaft 238.

Also mounted on the secondary shaft 265 are the reverse magnetic clutch 287 and the forward magnetic clutch 288. The reverse clutch 287 is adapted to actuate reverse armature sprocket 289, which engages chain 290, carried by idler sprocket 291 in order to drive the driven sprocket 293 in the reverse direction from the secondary shaft 265. The driven reverse sprocket 293 is fixed to the wheel drive shaft 247. In a similar manner, the forward clutch 288 is adapted to actuate the forward armature sprocket 295 carrying the chain 296 to drive the forward driven sprocket 297 also fixed to the wheel drive shaft 247.

The opposite ends of wheel drive shaft 247 support a right wheel drive sprocket 299 and a left wheel drive sprocket 300. As viewed in FIG. 5, an endless left wheel drive chain 301 is driven by the drive sprocket 300 to positively drive the forward wheel sprocket 302 fixed on the left forward wheel 24 and to drive the rear wheel sprocket 303 fixed on the left rear wheel 25. A similar chain 304 (FIG. 22) and sprockets, not shown, are driven by the wheel drive sprocket 299 in order to drive the right wheels 21 and 22.

It will be noted that the cloth feed clutch 267, reverse clutch 287 and forward clutch 288 are all mounted on the secondary drive shaft 265 so that they will all be driven at either high speed or low speed simultaneously. Thus, when the spreading machine frame 10 is driven either in forward or reverse direction at high speed, the cloth will also be feeding at high speed, but when the spreading frame 10 is moving at low speed in either forward or reverse direction, the cloth feed will also be simultaneously in low speed. However, regardless of the direction of the frame 10, the cloth feed rolls 37 and 38 will always be driven in the same direction, which is forward in FIG. 22.

A magnetic brake 305 is mounted on the feed roll drive shaft 48 to positively stop the cloth feed when the magnetic clutch 267 is de-energized. Also, a magnetic brake 306 is mounted on the wheel drive shaft 247 to positively stop the movement of the spreading frame 10 when both forward and reverse clutches 288 and 287 are de-energized.

The right edge-control magnetic clutch 239 is energized by the edge control mechanism 307 (FIG. 23) when the edge sensing unit 102 detects that the edge of the cloth 88 has moved too far to the right of the predetermined imaginary normal cloth feed line. When the magnetic clutch 239 is energized, then the screw shaft 253 is rotated in the reverse or counter-clockwise direction as viewed from the right side of the machine to turn screw 255 in collar 256 and move the cloth carriage 11 toward the left until the edge of the cloth 88 is approximately in normal alignment. When normal alignment is restored, the edge control 307 de-energizes the magnetic clutch 239.

In a similar manner, the left edge-control magnetic clutch 240 is energized when the edge of the cloth 88 has moved too far to the left. Consequently the screw 255 is driven in the reverse direction to move the cloth carriage 11 to the right until the edge of the cloth 88 has resumed normal alignment.

The high-speed magnetic clutch 263 is energized to drive the spreading machine frame 10 at a high speed as long as the track switch 308 engages the electrically conductive track 23. However, when the track switch 308 engages the insulator tape 309 which is fixed on the track 23 at a predetermined distance from each of the catcher mechanisms 14 and 15, then the high-speed magnetic clutch 263 is de-energized so that the primary shaft 238 and secondary shaft section 265 are coupled through the reduction drive train 279.

As best disclosed in FIGS. 9 and 10, the track switch 308 may include a pair of conductive contact rollers 310, one of which is connected to electrical lead 311 to control high-speed magnetic clutch 263, while the other roller 310 is grounded through lead 312. The track switch 308 includes a head 315 for supporting the roller conductors 310 and which is carried on the lower end of an arm 316 pivotally mounted by pin 317 to the right side frame member 17, for pivotal movement toward engagement with the track 23. A spring 318 is provided to bias the head 315 toward engagement with the track 23. The switch head 315 also carries a mercury switch 320 (FIG. 9) which is designed to be closed in the depending operative position shown in FIG. 9, but when swung laterally away from the track 23 and upwardly will automatically open the motion control circuit 321 (FIG. 23) to prevent movement of the frame 10 on the table 13.

Also adapted to energize the high-speed magnetic clutch 263 is an overriding cam switch 322 mounted on the supporting arm or plate 323 projecting forwardly of and fixed to the left side of frame member 18, as best disclosed in FIGS. 11, 12, and 14. The overriding cam switch 322 is preferably a microswitch and adapted to be energized by an actuating bar or arm 325 pivotally supported on support plate 323 for pivotal movement upward into engagement with the switch 322. A dependent finger 327 is freely pivoted to the actuator bar 325 in horizontal longitudinal alignment with a stop flange 330 projecting upwardly from an elongated stop bar 332 fixed by its bracket 333 to the back of the angle plate 174, as best disclosed in FIG. 8. As the frame 10 moves forwardly toward the catcher mechanism 14, the freely pivoted finger 327 will ride over the stop flange 330 without moving the switch actuator bar 325. However, as the spreading frame 10 moves away from the catcher mechanism 14, the opposite or rear edge of the finger 327 will engage the stop flange 330 and be forced backwardly against a flange 335 on the actuator arm 325 to pivot the actuator arm 325 upwardly until the microswitch 322 is actuated.

Another overriding high-speed switch 338, identical in construction to switch 322, is mounted on the inside of the left side frame member 18 and in alignment with the stop bar 339. The overriding switch 338 is provided with an actuator arm 340 pivoted about pin 341 to normally engage abutment 342 and disengage switch 338. Freely pivoted and depending from the actuator arm 340 by pin 343 is finger 344. Abutment flange 345 limits the rearward pivotal movement of finger 344. Thus, as the spreading frame 10 travels rearwardly over the catcher mechanism 15, the finger 344 merely rides over the stop 339 without energizing the overriding switch 338. However, when the frame 10 travels forward away from the catcher mechanism 15, the finger 344 engaging the stop 339 will be forced against the abutment flange 345 to raise the actuator arm, energize the switch 338, and change the speed of the spreading frame 10 from low to high, even before the track switch 308 leaves the insulator tape 309.

As a safety precaution to prevent the switch 338 or 322 from becoming damaged during its actuation, a leaf spring 347 may be fixed to the top of the actuator bar 340 so that as the actuator bar 340 is pivoted upwardly the leaf spring 347 will engage and energize the switch 338. The leaf spring 347 permits a certain degree of play and pivotal motion of the actuator bar 340 in case the stop bar 339 is too high or too low, without damaging the switch 338.

The cloth feed magnetic clutch 267 is normally energized to positively drive the cloth feed rollers 37 and 38 to feed cloth 88 from the cloth roll 40 through the cloth guide assembly 90 to the spreader unit 12. However, as previously described, when excess slack is developed in the cloth 88, the cloth takeup roll 105 will drop to depress the switch finger 112 and actuate the microswitch 111 to de-energize the cloth feed magnetic clutch 267 and energize the cloth feed magnetic brake 305 to stop the cloth feed.

The forward and reverse magnetic clutches 288 and 287 are designed so that when one is actuated, the other will be de-actuated, and vice versa. If the spreading frame 10 is moving forward toward the catcher mechanism 14, the button reversing switch 350 mounted on the left front end of the frame 10 will engage the elongated stop bar 332 to actuate the switch 350 to energize the reversing magnetic clutch 287 and simultaneously de-energize the forward magnetic clutch 288, immediately causing the spreading frame 10 to reverse and move reardly away from the catcher mechanism 14.

In a similar manner, when the spreading frame 10 reaches the rearward limit of its traverse, the rear button reversing switch 351 mounted on the inside of left side frame member 18 will abut against stop bar 339 fixed by bracket 352 to transverse angle plate 218 to actuate the reversing switch 351, to again energize the forward magnetic clutch 288 and simultaneously de-energize the reverse magnetic clutch 287.

As an additional safety precaution, normally closed limit switches 355 and 356, disclosed in FIGS. 22 and 23, are spaced laterally a predetermined distance apart to be engaged by a switch finger 357 mounted on the collar 256 when the cloth feed carriage 11 has been moved too far laterally in either direction. Where the contact finger 357 engages either switch 355 or 356, the corresponding edge-control magnetic clutch 240 or 239 is de-energized to stop the rotation of the screw 255. In addition, the normally closed limit switch 359 is located adjacent the right limit switch 356 so that it is simultaneously actuated to open the motion control circuit 321 (FIG. 23) and stop the movement of the frame 10.

With particular reference to FIG. 23, alternating current is supplied to the three-phase motor 225 through lines 360. The motor lines 360 are controlled by relay contacts 361 actuated by motor relay coil 362, which is energized by motor lines 360 through transformer 363 and secondary line 364. The motor lines 360 are carried in cable 365 having plug 366 (FIGS. 1 and 4), for connection with conventional overhead lines, not shown.

The secondary line 364 with a disclosed value of 115 v. A.C., also supplies the transformer-rectifier 368 to produce direct current, e.g. 90 v. in line 369, and transformer 370 to produce a small A.C. current, such as 12 v. A.C., in line 371.

The motion control circuit 321 includes motion relay coil 374 adapted to control normally open relay contacts 375 in motion control circuit 321, normally open relay contacts 376 in motion circuit 377, and normally closed relay contacts 378 in the motion brake circuit 379 to control magnetic brake 306.

The motion control circuit 321 also includes a manual motion control switch 380 and a manual override switch 381 in parallel with the no-cloth limit switch 359. In parallel with the relay contacts 375 are manual momentary push-drive switches 382 and 383, located on the front and rear, respectively, of the manual control box 385 (FIG. 1).

The direction control circuit 387 includes an impulse-type relay 388 having a forward coil 389 and a reverse coil 390 connected in parallel circuits 391 and 392 respectively. Front reversing switch 350 is in circuit 392 and rear reversing switch 351 is in circuit 391. Direction relay 388 is so constructed that when one coil 389 or 390 is energized, the other coil is simultaneously de-energized. When the forward coil 389 is energized, its relay contacts 397 are closed to illuminate forward indicator light 398, and its relay contacts 393 are closed to energize forward magnetic clutch 288, when motion circuit 377 is closed. When reverse coil 390 is energized, its relay contacts 394 are closed to illuminate reverse indicator light 395, and its relay contacts 396 are closed to energize reverse magnetic clutch 287, when motion circuit 377 is closed. The direction control circuit 387 may also include a manual momentary switch 399 for producing an impulse to reverse the energization of coils 389 and 390.

The left relay coil 410 in the edge-control 307 is energized by the appropriate sensing mechanism, not shown, such as a photoelectric cell, when the edge of the cloth 88 has deviated too far to the left of the normal cloth feed line. The energized left relay coil 410 actuates its relay contacts 411 to illuminate the left indicator light 412 mounted on right side plate 93, and its relay contacts 413 to energize the left magnetic clutch 240.

The right relay coil 415 in the edge control 307 is also energized by the edge sensing mechanism, not shown, when the edge of the cloth 88 has deviated too far to the right of the normal cloth feed line. The energized right relay coil 415 actuates its relay contacts 416 to illuminate the right indicator light 417, mounted on the right side plate 93, and its relay contacts 418 to energize the right magnetic clutch 239.

As disclosed in FIG. 23, the electrical lead 311 from one of the conductive switch rollers 310 is connected to high speed relay coil 420, which in turn is connected to the low-voltage secondary circuit 371. When coil 420 is energized by conductive rollers 310 engaging track 23, relay contacts 421 are closed to energize high-speed clutch 263, and normally closed relay contacts 422 are opened in the high speed override circuit 423.

When high-speed relay coil 420 is de-energized by the rollers 310 engaging insulator tape 309, relay contacts 421 are opened and contacts 422 are closed, and the high-speed override relay coil 425 may be energized by either of the momentary override switches 322 or 338 to close relay contacts 426, and thereby maintain the override circuit 423 closed until high-speed coil 420 is re-energized to open contacts 422 and override circuit 423. As long as the override relay coil 425 is energized, its relay contacts 427 will remain closed to energize high-speed clutch 263, even through the rollers 310 are riding on the insulator tape 309.

In addition to the previously described switches, a manual motor or power switch 430 is included in secondary circuit 364 to turn on and off the motor 225. Manual cloth feed switch 431 may also be provided to stop the cloth feed, even in the absence of slack. Manual switch 432 may be provided in secondary circuit 371 to manually change the speed of the frame 10 from high to low when desired.

Manual override high speed switch 433 is an optional feature between leads 311 and 312.

Most of the above mentioned manual switches and indicator lights are mounted on the manual control box 385, as best disclosed in FIG. 1.

The operation of the spreading machine is as follows:

Assuming the machine frame 10 is stationary on the table 13 anywhere between the cloth catcher mechanisms 14 and 15 where the track switch 308 can conductively engage the track 23 and the machine is empty of cloth, the operator's first duty is to load the cloth roll 40 upon the machine. In order to accomplish this, the latch bar 56 is pivoted to the rear about the pin 57, and the right standard 53 is swung outwardly about the hinge 55. The cloth roll 40 is then placed upon the cloth carriage 32 longitudinally between and upon both cloth feed rollers 37 and 38. By manipulating the hand wheel 82, the left conical bearing 75 is adjusted to align coaxially with the left end of the cloth roll 40. The cloth roll 40 is then pushed against the conical bearing 75, the hand wheel 82 released, and the right standard 53 swung upwardly. The operator then manipulates the right conical bearing 65 to engage the right end of the cloth roll 40 by manually adjusting the height of the spindle support 60. The upright standard 53 is then latched in position by the latch bar 56. In the machine shown in the drawings, the web or sheet of cloth 88 is unrolled from the bottom forwardly, and manually threaded through the cloth guide assembly 90 and, as disclosed in FIG. 5, through the spreader unit 12 between the fold blades 152 and 151, beneath the frame 10 until the cloth 88 is held by the rear catcher mechanism 15. With the power switch 430 on, and the track switch 308 pivoted downwardly into engagement with the track 23, either momentary drive switch 382 or 383 may be pushed to energize the motion relay 374 and motion circuit 377 to drive the machine frame 10 at high speed forward, assuming forward relay coil 389 is energized. As the machine frame 10 traverses forwardly, the cloth feed rolls 37 and 38 will also be driven at high speed so that the cloth 88 will be laid on the table 13 at the same speed that the frame 10 is travelling. As viewed in FIG. 5, the cloth is spread by the rear fold blade 152. The edge sensing head 102 senses the edge of the moving cloth 88 to maintain it in a straight line as previously described, and the take-up bar 105 will actuate the switch 111, in the event excess slack is developed, in order to stop the cloth feed.

When the spreading frame 10 approaches the forward limit of its travel, as disclosed in FIG. 1, and subsequently in FIG. 6, the track switch 308 will ride upon the insulator tape 309 to break electrical contact with the track 23. Consequently, the high-speed magnetic clutch 263 will become de-energized so that only the slow-speed drive train 279 drives the secondary shaft 265, and the frame 10 will approach the catcher mechanism 14 at low speed. The length of the tape 309 from the catcher mechanism 14 is sufficient to permit the spreader unit 12 to slow down just prior to engagement with the catcher mechanism 14 to fold the forward end of the cloth 88. The detailed description of the actuation of the spreader unit 12 for folding the cloth will be described later in connection with its engagement with the stationary, rear cloth catcher mechanism 15.

After the fold has been made in the right end of the cloth, the front reversing switch 350 engages the stop bar 332 to energize the direction relay 388, which energizes the reverse magnetic clutch 287, and simultaneously de-energizes the forward magnetic clutch 288, to reverse the direction of the wheel drive shaft 247 and start the machine frame 10 moving rearwardly toward the rear catcher mechanism 15.

As previously described, the front overriding switch 322 merely passes over the stop flange 330 without actuation as the frame 10 approaches the front catcher mechanism 14. However, on reverse movement of frame 10, the overriding switch 322 is momentarily actuated by the stop 330, within a shorter distance than the length of the insulator tape 309, to energize the over-riding high-speed relay 425, which overrides the normal high-speed relay 420, to energize the high-speed magnetic clutch 263 in order for the frame 10 to resume its high-speed travel toward the rear catcher mechanism 15.

In a similar manner, as the frame 10 approaches the catcher mechanism 15, the track switch 308 again engages an insulator tape, not shown, similar to tape 309, spaced at the same predetermined distance from the catcher mechanism 15. The machine frame 10 then approaches the catcher mechanism 15 at slow speed with the rear overriding switch 338 passing over the stop bar 339 without actuation.

As viewed in FIGS. 15–20, the engagement and actuation of the spreader unit 12 and the catcher mechanism 15 is shown in sequential detail. FIG. 15 discloses the spreader unit 12 approaching the rear catcher mechanism 15 at slow speed, with the front fold blade 151 functioning as the trailing blade engaging and spreading the cloth 88. In this sequence, the rear fold blade 152 functions as the leading fold blade. FIG. 15 also shows initial contact between the left rear pivotal cam follower 163 with the forward or leading edge 207 of the cam 204 mounted on the left end of the catcher plate 200. Continued rearward movement of the spreader unit 12 causes the cam follower 163 resting against the rear ledge 168 to ride rearwardly along the front surface 207, thereby raising the cam 204 and the catcher plate 200 upwardly on the standard 213.

FIG. 16 shows the catcher plate 200 raised to the position where the cam follower 158 engages the toe portion 202 of the cam surface 201 to elevate the lead fold blade 152 out of the way of the catcher plate 200.

FIG. 17 shows the leading fold blade 152 elevated completely out of the way of the catcher plate 200 by virtue of the cam follower 158 riding rearwardly over the cam surface 201. Moreover, in this position, the pivoted cam follower 163 has ridden rearwardly along the bottom edge 206 of the raised cam 204, so that the trailing fold blade 151 carries the cloth 88 beneath the catcher plate 200 to begin the rear fold in the cloth 88.

FIG. 18 shows practically the limit of rearward travel of the frame 10 where the cam follower 163 has passed completely beneath the cam 204 to drop the catcher plate 200 upon the cloth 88 and the trailing fold blade 151 in order to complete the fold. Of course, the leading fold blade 152 supported on the cam surface 201 by the cam follower 158 falls with the catcher plate 200. Approximately at this time, the rear reversing switch 351 engages the stop bar 339 to reverse the direction of the frame 10 from rearward to forward.

FIG. 19 shows the forward fold blade 151 now moving forward from beneath the catcher plate 200 to become the leading fold blade, while the rear fold blade 152 also moves forwardly along the cam surface 201 to become the trailing fold blade. Simultaneously, the pivotal cam follower 163 moves forward and upwardly along the back edge 208 of cam 204 to pivot the cam follower 163 about its pivot pin 166.

FIG. 20 shows the front fold blade 151 completely removed from the catcher plate 200 which has been dropped upon the cloth 88 to maintain the rear fold and the rear fold blade 152 has descended to its original position opposing the front fold blade 151 after the cam follower 158 has completely disengaged the cam surface 201 and toe portion 202.

Normally, the cam follower 163 will be elevated to ride forwardly over the top land 205 without engaging the upper stop limit screw 167. However, as disclosed in FIG. 20, when the layers of cloth have been built up to a predetermined level, the follower arm 165 will engage the stop limit screw 167 before the cam follower 163 reaches the land 205, thus forcing upwardly, not only the stop screw 167, but the entire spreader unit 12, relative to the machine frame 10. The upward movement of the spreader unit 12 of course, causes the pinions 126 and 127 to roll upwardly on the respective racks 128 and 129. If the increment of elevation is sufficient, then whichever pawl 134 or 135 was not previously engaged, will engage the next higher tooth on the ratchet bar 132 to maintain the spreader unit 12 at that elevation. In this manner, the spreader unit 12 is gradually raised with the increase in the height of the cloth layers. Moreover, the elevation of the spreader unit 12 is a direct function of the thickness and height of the cloth layers. Consequently, this construction of the pivotal cam followers 160–163, cams 190, 191 and 204, and stop screws 167, is functionally different from previously used mechanisms for elevating cloth spreading units, which are automatically actuated upon each traverse or cycle of the spreading frame 10 without regard to the height of the cloth layers, and which had to be adjusted constantly in order to accommodate the thicknesses of the cloth and the height of the cloth layers.

Immediately after the cloth spreader unit 12 has completely disengaged the catcher mechanism 15, the rear overriding switch 338 is actuated by the stop bar 339, as previously described, to energize the overriding relay 425 and override the normal high-speed relay 420 to energize the high-speed magnetic clutch 263 and resume the normal high-speed of the machine frame 10, even while the track switch 308 still engages the insulator tape 309. The movement of the frame 10 and the spreading cycle is then repeated.

If the frame 10 continues to traverse the table 13 until the cloth roll 40 is exhausted, the absence of cloth in the edge sensing head 102 will cause the cloth carriage 11 to move toward the right until the switch finger 357 engages the limit switch 359, which is immediately opened to de-energize the motion relay 374, to open the motion circuit 377 and stop the frame 10.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A machine for spreading cloth upon an elongated table comprising:
 (a) a frame supported on said table for reciprocable longitudinal movement,
 (b) a cloth spreader unit mounted on said frame for spreading cloth longitudinally of said table as said frame is moving,
 (c) a cloth supply support mounted on said frame, (d) a pair of cloth feed rollers mounted on said cloth supply support to extend transversely of said frame and spaced apart for supporting a cloth roll, (e) means for driving said cloth feed rollers in the same direction to feed cloth toward said spreader unit, (f) an upright standard mounted on said cloth supply support on each side of said cloth roll, each standard comprising a vertical guideway, (g) a first spindle and a second spindle for insertion in the opposite ends of a core of a cloth roll, (h) mounting means for each spindle received in said corresponding guideway for free vertical movement, (i) remote control means for elevating and lowering said first spindle mounting means in said corresponding guideway including an endless linear member connected to said first spindle mounting means and carried on rotatable guide members to a remote position on said frame, where, by manipulation of said endless member, said first mounting means is moved vertically in said guideway.

2. The invention according to claim 1 in which said rotatable guide members comprise an upper pulley mounted adjacent the top of said first standard, lower pulleys mounted adjacent the bottom of said first standard, a plurality of other pulleys mounted transversely of said frame and a hand wheel at said remote position, said endless linear member comprising an endless cable threaded around said pulleys and said hand wheel, so that said first spindle mounting means may be raised when said hand wheel is rotated in one direction, and lowered when said hand wheel is rotated in the opposite direction.

3. The invention according to claim 1 in which means are provided for pivotally mounting said second standard on said supply support for swinging movement between an upright operative position and an outboard inoperative position, and means for securing said second standard in its upright operative position.

References Cited
UNITED STATES PATENTS

| | | | |
|---|---|---|---|
| 2,118,556 | 5/1938 | Haberstump et al. | 270—31 |
| 3,104,072 | 9/1963 | Doven et al. | 242—66 |

EUGENE R. CAPOZIO, Primary Examiner

P. V. WILLIAMS, Assistant Examiner

U.S. Cl. X.R.

242—68.7